United States Patent [19]

Sasaki et al.

[11] Patent Number: 4,737,625
[45] Date of Patent: Apr. 12, 1988

[54] ARRANGEMENT STRUCTURE OF PLURAL ROWS OF OVERLAPPING OPTICAL ELEMENTS

[75] Inventors: Hiroaki Sasaki; Kazuo Hasegawa; Junichi Ouchi, all of Furukawa, Japan

[73] Assignee: Alps Electic Co., Ltd., Japan

[21] Appl. No.: 864,704

[22] Filed: May 19, 1986

[30] Foreign Application Priority Data

May 17, 1985 [JP] Japan ................................ 60-105328

[51] Int. Cl.⁴ ............................................ G01V 9/04
[52] U.S. Cl. .................................. 250/221; 250/222.1
[58] Field of Search ...................... 250/221, 222.1, 208, 250/209, 211 R, 216, 560; 340/555, 556, 557

[56] References Cited

U.S. PATENT DOCUMENTS

| 3,060,791 | 10/1962 | Tarczy-Hornoch | 250/560 |
| 3,727,069 | 4/1973 | Crittenden et al. | 250/222.1 |
| 3,737,856 | 6/1973 | Lehrer et al. | 250/560 |
| 3,781,842 | 12/1973 | Campman | 250/221 |

Primary Examiner—David C. Nelms
Attorney, Agent, or Firm—Guy W. Shoup

[57] ABSTRACT

An arrangement structure of optical elements is characterized in that light emitting and/or light receiving optical elements are mounted on a substrate in a zigzag fashion, whereby the resolving power of the arrangement can be enhanced.

4 Claims, 1 Drawing Sheet

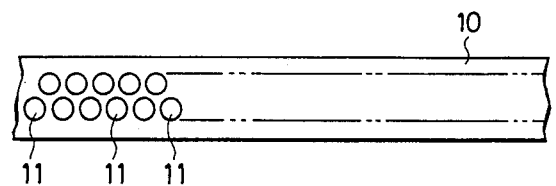
FIG. 1
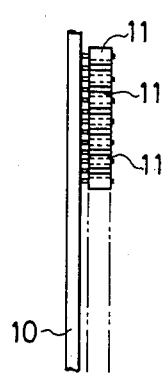
FIG. 2
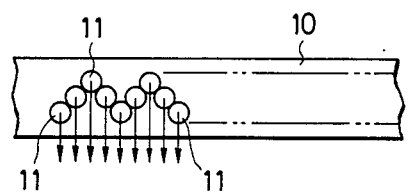
FIG. 3
FIG. 4 PRIOR ART
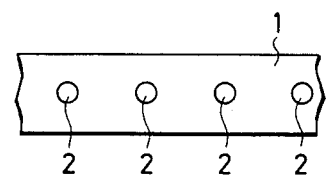
FIG. 5 PRIOR ART
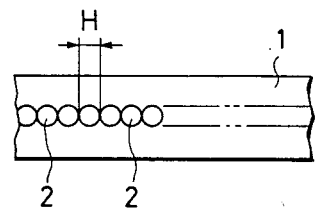

ARRANGEMENT STRUCTURE OF PLURAL ROWS OF OVERLAPPING OPTICAL ELEMENTS

BACKGROUND OF THE INVENTION

1. Field of the Invention

This invention relates to an arrangement of optical elements and, more particularly, to an arrangement structure on a substrate of light emitting elements for generating infrared beams of the form of a matrix and/or light receiving elements to enable inputting into a computer.

2. Description of the Prior Art

Hitherto, the arrangement of optical elements of this kind is like that illustrated in FIG. 4. That is, in FIG. 4, reference numeral 1 indicates a substrate, on this substrate 1 optical elements 2, 2, . . . , such as LEDs and/or phototransistors, being arranged at a certain spacing.

However, according to such a structure, the resolving power of a screen has a limit, and even if a gap is removed as shown in FIG. 5 and the optical elements 2 are arranged mutually closely so as to abut one upon another, since each has a size H not smaller than a certain dimension depending upon its configuration, this size H finally became the limit of resolving power. In view of this limit, it was hardly possible to answer the demand, arising recently, that the optical elements should be usable as an input means for drawing pictures or illustrations, other than a simple data input means, and a smooth curve could not be obtained.

SUMMARY OF THE INVENTION

It is an object of the present invention to solve the foregoing problem of the prior art, thus to provide an arrangement structure of optical elements permitting drawing of smooth curves, as well as enhancing of the resolving power more finely than the size of the optical element.

To achieve the foregoing object, the present invention is characterized in that optical elements are mounted on a substrate in a zigzag fashion.

BRIEF DESCRIPTION OF THE DRAWINGS

FIG. 1 is a plan view showing an arrangement structure of optical elements according to the present invention;

FIG. 2 is a side view of the above;

FIG. 3 is a plan view showing another embodiment of the present invention;

FIG. 4 is a plan view showing the conventional arrangement structure of optical elements; and FIG. 5 is a plan view illustrating the limit of the conventional structure.

DESCRIPTION OF THE PREFERRED EMBODIMENTS

Embodiments of the present invention will now be described with reference to the drawings.

In the drawings, reference numeral 10 indicates a substrate, on this substrate 10 optical elements 11, 11, . . . , such as LEDs and phototransistors, being arranged in a zigzag fashion. The zigzag arrangement is made so that the spacing between the optical elements 11 and 11 in respective rows is narrower than the size of each optical element 11; thus, the spacing between the infrared beams generated by the corresponding optical elements 11 and 11 is made narrower than the size of each optical element, thereby resulting in a micro-structurized arrangement.

It is to be understood that the zigzag arrangement of the optical elements 11, 11, . . . should not be limited to that of two rows, otherwise, as shown in FIG. 3, by arranging them on the substrate 10 so as to create a plurality of rows extending in the lengthwise direction of the substrate and making the optical elements 11, 11, . . . of each row contact closely with each other, the spacing between the infrared beams can be made more narrow and a further promoted degree of micro-structurization can be attained.

As described hereinabove, according to the present invention, the spacing between the infrared beams can be made narrower than the size of the optional element to enhance the resolving power and permit fine setting of points; thus, it becomes also possible to draw a smooth curve.

What is claimed is:

1. An array structure of optical elements for forming a light beam matrix in an optical input device, comprising:

an elongated mounting substrate for mounting a plurality of optical elements on at least one side of said input device, wherein each optical element has a predetermined width in the direction of the length of said substrate; and said plurality of optical elements being arranged in plural parallel rows along the length of said substrate, wherein the optical elements in each row are spaced apart at equal intervals, and the spacing intervals of the plural rows of optical elements are selected such that the width of each optical element in any row overlaps the width of at least one other optical element in at least one other row, whereby a fine degree of resolving power of said matrix is obtained for inputting a smooth curve of points.

2. An array structure according to claim 1, wherein said optical elements are arranged in three adjacent rows with spacings forming a triangular configuration in which each optical element is arranged to abut two other optical elements in the adjacent row or rows.

3. An arrangement structure of optical elements according to claim 1, wherein said optical elements are LEDs and/or phototransistors.

4. An arrangement structure of optical elements according to claim 1, wherein said optical elements are arranged so as to abut one another in an adjacent row.

* * * * *